United States Patent Office.

ALBRECHT SCHMIDT, OF BERLIN, GERMANY, ASSIGNOR, BY MESNE ASSIGNMENTS, TO CHEMISCHE FABRIK AUF ACTIEN, (VORM. E. SCHERING,) OF SAME PLACE.

WATERPROOF CASEIN AND METHOD OF PRODUCING SAME.

SPECIFICATION forming part of Letters Patent No. 670,689, dated March 26, 1901.

Application filed December 15, 1897. Serial No. 662,036. (No specimens.)

*To all whom it may concern:*

Be it known that I, ALBRECHT SCHMIDT, of the city of Berlin, German Empire, have invented a new and useful Improvement in Waterproof Casein and Method of Producing Same, (for which I have received British Letters Patent No. 23,585, dated December 4, 1894,) of which the following is a specification.

When a solution of soda casein of about five-per-cent. strength is mixed with formaldehyd, no coagulation takes place. The solution remains for a long time clear and fluid. When this solution is poured upon a plate or other support or backing and allowed to dry, a transparent film or layer of casein is formed, which is completely insoluble in water.

Films of casein treated with formaldehyd and films not so treated are easily distinguished by the following test: The film is carefully removed from the backing and soaked in water, to which a few drops of methylene-blue are added. Upon warming the samples carefully a light-blue color appears in the samples not treated with formaldehyd, while a deep-blue color appears in the samples which have been rendered waterproof by this treatment. An ammonia-casein solution acts in a similar manner; but in this case a thickening or precipitation takes place when large quantities of formaldehyd are added. When the added quantity of formaldehyd is small, the solution remains clear, and the film formed by the evaporation or drying of this clear solution upon a backing or support is waterproof.

In order to produce a waterproof substance, film, or layer from soda casein, I form a solution containing, in one liter of water, about one hundred grams of casein and about 1.5 grams of soda, (NaOH.) To this solution is added about fifteen grams of a forty-per-cent. solution of formaldehyd. This solution, which remains quite clear, is then dried or evaporated upon a glass plate or other backing—for instance, a zinc plate, paper, &c.

In order to produce a waterproof substance, film, or layer from ammonia casein, I form a solution containing, in two liters of water, about one hundred grams of casein and about ten cubic centimeters of a ten-per-cent. ammonia solution. To this is added about thirty grams of a forty-per-cent. formaldehyd solution. The casein is then dried, as above explained.

The film or layer of waterproof casein is either left upon the backing or removed therefrom, according to the use which is to be made of the same. This waterproof substance can be utilized in many different industries—for example, in photography, in the manufacture of surgical bandages, in paper manufacture, &c. Various substances may be added to the casein as the ultimate product may require or permit.

Instead of treating the casein in solution with formaldehyd it can be evaporated before adding the formaldehyd, then submitted to the action of the formaldehyd solution, and the absorbed liquid be finally evaporated, or the casein, not completely dried but still moist, can be subjected to the action of gaseous formaldehyd and then be evaporated to dryness.

I claim as my invention—

1. The herein-described waterproof substance consisting of casein converted by formaldehyd, substantially as set forth.

2. The herein-described method of producing waterproof casein which consists in forming an alkaline solution of casein, treating the same with formaldehyd and drying the same, substantially as set forth.

In testimony whereof I have hereunto set my hand this 30th day of November, 1897.

ALBRECHT SCHMIDT.

Witnesses:
CHAS. H. DAY,
HENRY HASPER.